US009722785B2

(12) United States Patent
Kim et al.

(10) Patent No.: US 9,722,785 B2
(45) Date of Patent: Aug. 1, 2017

(54) METHOD AND APPARATUS FOR QUANTUM CRYPTOGRAPHIC COMMUNICATION

(71) Applicant: KOREA INSTITUTE OF SCIENCE AND TECHNOLOGY, Seoul (KR)

(72) Inventors: Yong-Su Kim, Seoul (KR); Sang Wook Han, Seoul (KR); Sung Wook Moon, Samcheok-si (KR); Yujun Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 222 days.

(21) Appl. No.: 14/590,585

(22) Filed: Jan. 6, 2015

(65) Prior Publication Data

US 2016/0359624 A1 Dec. 8, 2016

(30) Foreign Application Priority Data

Aug. 19, 2014 (KR) ........................ 10-2014-0107645

(51) Int. Cl.
*H04L 9/08* (2006.01)
*H04B 10/70* (2013.01)

(52) U.S. Cl.
CPC ........... *H04L 9/0855* (2013.01); *H04B 10/70* (2013.01); *H04L 2209/34* (2013.01)

(58) Field of Classification Search
CPC .... H04L 9/0855; H04L 2209/34; H04B 10/70
See application file for complete search history.

(56) References Cited

U.S. PATENT DOCUMENTS 7,324,647 B1 * 1/2008 Elliott ................... H04B 10/70
370/390
7,627,126 B1 * 12/2009 Pikalo ................... H04L 9/0858
356/473

(Continued)

FOREIGN PATENT DOCUMENTS

JP 4060551 B2 3/2008
JP 2012-80496 A 4/2012

(Continued)

OTHER PUBLICATIONS

Muller, A., et al., "Plug and play" systems for quantum cryptography, Applied Physics Letters, vol. 70, Feb. 17, 1997 (pp. 793-795).

(Continued)

*Primary Examiner* — Joseph P Hirl
*Assistant Examiner* — Stephen Gundry
(74) *Attorney, Agent, or Firm* — NSIP Law

(57) ABSTRACT

An apparatus for quantum cryptographic communication includes a light source configured to generate an optical pulse which is transmitted to a plurality of quantum code sending devices, and a quantum entanglement measuring unit configured to receive the optical signal generated from each of the plurality of quantum code sending devices and measure a relation among quantum states of the optical signals received from the plurality of quantum code sending devices; the optical signal being generated by encoding a key to a quantum state of the optical pulse. The apparatus for quantum cryptographic communication may further include a signal direction determining unit, a reflector for reflecting the optical pulse or the optical signal, an arbitrary phase shifter, or a modulator for encoding a digital signal corresponding to the key to the optical pulse.

6 Claims, 5 Drawing Sheets

(56) References Cited

U.S. PATENT DOCUMENTS

| | | | |
|---|---|---|---|
| 7,639,947 B2 | 12/2009 | Luo et al. | |
| 7,697,693 B1* | 4/2010 | Elliott | H04B 10/70 380/278 |
| 8,477,939 B2* | 7/2013 | Youn | H04B 10/70 380/256 |
| 2005/0100351 A1* | 5/2005 | Yuan | H04L 9/0858 398/214 |
| 2005/0152540 A1* | 7/2005 | Barbosa | H04L 9/0858 380/28 |
| 2005/0157875 A1* | 7/2005 | Nishioka | H04L 9/0858 380/46 |
| 2006/0280509 A1* | 12/2006 | Tomaru | H04L 9/0662 398/188 |
| 2007/0009098 A1* | 1/2007 | Tanaka | H04L 1/242 380/30 |
| 2007/0064945 A1* | 3/2007 | Yuan | H04L 9/0858 380/263 |
| 2007/0065154 A1* | 3/2007 | Luo | H04B 10/70 398/141 |
| 2007/0065155 A1* | 3/2007 | Luo | H04B 10/70 398/141 |
| 2007/0071244 A1* | 3/2007 | LaGasse | H04L 9/0858 380/278 |
| 2007/0133798 A1* | 6/2007 | Elliott | H04B 10/70 380/255 |
| 2007/0182968 A1* | 8/2007 | Nishioka | H04L 9/0858 356/491 |
| 2008/0013738 A1* | 1/2008 | Tajima | H04L 9/0852 380/278 |
| 2008/0273703 A1* | 11/2008 | LaGasse | H04B 10/70 380/278 |
| 2009/0010435 A1* | 1/2009 | Zbinden | H04L 9/0852 380/256 |
| 2009/0022322 A1* | 1/2009 | Trifonov | H04L 9/0852 380/278 |
| 2009/0180615 A1* | 7/2009 | Trifonov | H04B 10/70 380/256 |
| 2009/0185689 A1 | 7/2009 | Beal | |
| 2010/0002881 A1* | 1/2010 | Youn | H04L 9/0858 380/256 |
| 2010/0027794 A1* | 2/2010 | Yuan | H04B 10/70 380/255 |
| 2010/0158252 A1* | 6/2010 | Youn | H04L 9/0858 380/256 |
| 2010/0226659 A1* | 9/2010 | Nishioka | H04B 10/70 398/154 |
| 2011/0051227 A1* | 3/2011 | Arahira | G02F 1/3519 359/328 |
| 2011/0280405 A1* | 11/2011 | Habif | H04B 10/70 380/278 |
| 2012/0051740 A1* | 3/2012 | Arahira | H04B 10/70 398/28 |
| 2012/0051755 A1* | 3/2012 | Arahira | H04L 9/0855 398/158 |
| 2012/0195428 A1* | 8/2012 | Wellbrock | H04L 9/0855 380/255 |
| 2013/0016835 A1* | 1/2013 | Zbinden | H04L 9/0852 380/255 |
| 2015/0249537 A1* | 9/2015 | Wabnig | H04B 10/70 380/256 |
| 2016/0028541 A1* | 1/2016 | Wilkinson | H04L 9/0858 380/256 |
| 2017/0019252 A1* | 1/2017 | Bitauld | H04L 9/0852 |

FOREIGN PATENT DOCUMENTS

| | | |
|---|---|---|
| KR | 10-2007-0061016 A | 6/2007 |
| KR | 10-2008-0052234 A | 6/2008 |
| KR | 10-2009-0124679 A | 12/2009 |
| KR | 10-1252757 B1 | 4/2013 |
| WO | WO 2008/069490 A1 | 6/2008 |
| WO | WO 2009/145392 A1 | 12/2009 |
| WO | WO 2014/115118 A2 | 7/2014 |

OTHER PUBLICATIONS

Lo, H., et al., "Measurement-device-independent quantum key distribution," Physical Review Letters, vol. 108, Mar. 30, 2012 (5 pages).

Liao, Z., "Experimental Realization of Decoy State Polarization Encoding Measurement-Device-Independent Quantum Key Distribution," Diss. University of Toronto, 2013 (86 pages).

* cited by examiner

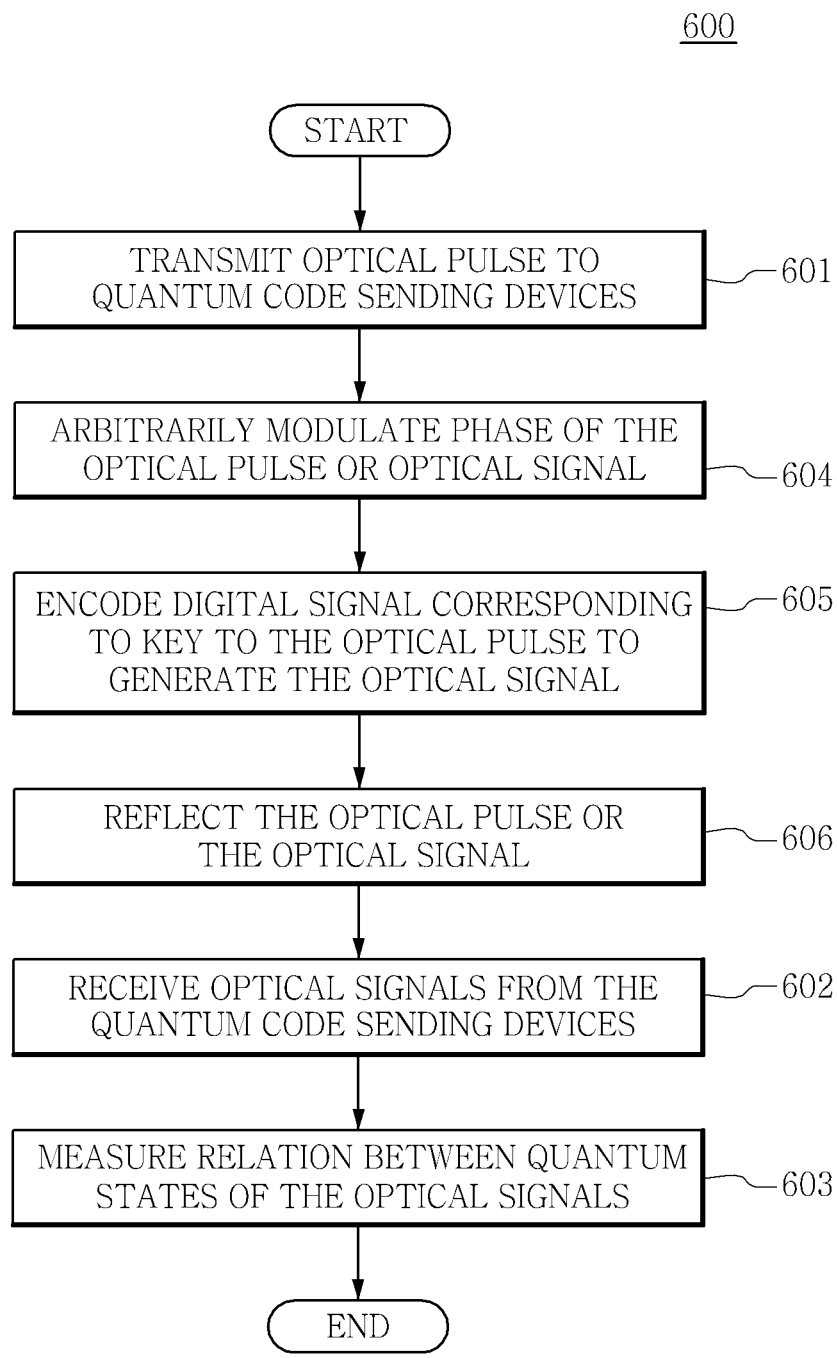

METHOD AND APPARATUS FOR QUANTUM CRYPTOGRAPHIC COMMUNICATION

CROSS-REFERENCE TO RELATED APPLICATION

This application claims priority to Korean Patent Application No. 10-2014-0107645, filed on Aug. 19, 2014, and all the benefits accruing therefrom under 35 U.S.C. §119, the contents of which in its entirety are herein incorporated by reference.

BACKGROUND

1. Field

Embodiments relate to a method and an apparatus for quantum cryptographic communication, and more particularly, to a technique for distributing secure keys regardless of a measurement device.

[Description about National Research and Development Support]

This study was supported by the Information Communication Technology R&D program of Ministry of Science, ICT and Future Planning, Republic of Korea (Project No. 2014-044-014-002) under the superintendence of Korea Institute of Science and Technology.

2. Description of the Related Art

Recently, as communication security becomes an issue due to large-scale personal information leakage, the demand on a safe cryptographic system is increasing. Generally, cryptographic systems do not use physical phenomena but use mathematical conundrums which lower the probability of hacking. Therefore, the probability of hacking a cryptographic system and analyzing encrypted information from outside still exists.

Meanwhile, quantum cryptography is a cryptographic system which has been developed based on uncertainty of quantum mechanics in which a single photon exhibiting a quantum effect cannot be reproduced. Communication subjects share the same secure key safely by using quantum to encrypt or decrypt information by using the key. Theoretically, if hacking is attempted from the outside, the characteristics of photon change, and thus the original secure key or information cannot be obtained from the outside, thereby ensuring a hacking-free cryptographic system.

In fact, however, hacking may be possible due to defects or imperfection of a measurement device used for the quantum cryptographic system. Therefore, studies about a measurement-device-independent quantum key distribution system (MDI QKD) capable of distributing a secure key regardless of a measurement device have been carried on.

FIG. 1 is a block diagram schematically showing a measurement-device-independent quantum cryptography system. Referring to FIG. 1, a first quantum code sending device (Alice) 110 and a second quantum code sending device (Bob) 120 respectively include a light source 101 and a light source 102, and convert an optical pulse generated from the light sources 101, 102 into an optical signal having information and transmit the optical signal to a quantum cryptographic communication apparatus (Charlie) 100 through a quantum channel 104. After that, the quantum entanglement measuring unit 103 measures a relation between a plurality of received optical signals by using a quantum entanglement base and distributes common information to both quantum code sending devices 110, 120 to ensure a secure key distribution system regardless of a measurement device.

However, in an existing measurement-device-independent quantum cryptography system, the light sources 101, 102 of a plurality of quantum code sending devices 110, 120 should be perfectly identical not to be distinguished, and a device (or, an active control) for measuring a difference of attributes of optical signals generated from the light sources 101, 102 and feeding back the attributes to be identical is required. However, this feedback device may not be practically commercialized due to difficult implementation and great costs.

SUMMARY

The present disclosure is directed to a method and an apparatus for quantum cryptographic communication, which is irrelevant to defects of a measurement device and distributes a secure key by using an optical signal generated from the same light source.

In addition, the present disclosure is directed to a method and an apparatus for quantum cryptographic communication, which may generate a plurality of optical pulses or optical signals having the same attribute without any separate feedback device.

Moreover, the present disclosure is directed to a method and an apparatus for quantum cryptographic communication, which is robust against environmental changes.

In one aspect of the present disclosure, there is provided an apparatus for quantum cryptographic communication, which includes: a light source configured to generate an optical pulse which is transmitted to a plurality of quantum code sending devices; and a quantum entanglement measuring unit configured to receive the optical signal generated from each of the plurality of quantum code sending devices and measure a relation among quantum states of the optical signals received from the plurality of quantum code sending devices, the optical signal being generated by encoding a key to a quantum state of the optical pulse.

In an embodiment, the apparatus for quantum cryptographic communication may further include a signal direction determining unit configured to transmit the optical pulse of the light source to the quantum code sending device and transmit the optical signal of the quantum code sending device to the quantum entanglement measuring unit.

In addition, the signal direction determining unit may be an optical circulator.

In an embodiment, the quantum code sending device may further include a reflector for reflecting the optical pulse or the optical signal.

The reflector may be a Faraday mirror.

In an embodiment, the quantum code sending device may include an arbitrary phase shifter for arbitrarily modulating a phase of the optical pulse or the optical signal.

In an embodiment, the quantum code sending device may include a modulator for encoding a digital signal corresponding to the key to the optical pulse.

In addition, in an embodiment, the light source may be a quantum entanglement light source.

In another aspect of the present disclosure, there is provided a method for quantum cryptographic communication, which includes: transmitting an optical pulse to a plurality of quantum code sending devices; receiving a plurality of optical signals from the plurality of quantum code sending devices, each of the optical signals being generated by encoding a key to a quantum state of the optical pulse in the quantum code sending device; and measuring a relation among quantum states of the plurality of optical signals.

In an embodiment, the method for quantum cryptographic communication may further include reflecting the optical pulse or the optical signal, between the step of transmitting the optical pulse to the plurality of quantum code sending devices and the step of receiving the plurality of optical signals from the plurality of quantum code sending devices.

The step of reflecting the optical pulse or the optical signal may include reflecting the optical pulse or the optical signal after rotating a polarization of the optical pulse or the optical signal.

In an embodiment, the method for quantum cryptographic communication may further include arbitrarily modulating a phase of the optical pulse or the optical signal, between the step of transmitting the optical pulse to the plurality of quantum code sending devices and the step of receiving the plurality of optical signals from the plurality of quantum code sending devices.

In an embodiment, the method for quantum cryptographic communication may further include generating the optical signal by encoding a digital signal corresponding to the key to the optical pulse, between the step of transmitting the optical pulse to the plurality of quantum code sending devices and the step of receiving the plurality of optical signals from the plurality of quantum code sending devices.

According to an embodiment of the present disclosure, a method and an apparatus for quantum cryptographic communication irrelevant to defects of a measurement device, and generating a plurality of optical pulses or optical signals having the same attribute such as polarization, timing, spectral property or the like without any separate feedback device, thereby enhancing the practicality may be provided.

In addition, according to an embodiment of the present disclosure, a quantum cryptographic communication which is robust against environmental changes may be implemented.

BRIEF DESCRIPTION OF THE DRAWINGS

FIG. 3 is a block diagram schematically showing a quantum code sending device which an apparatus for quantum cryptographic communication according to an embodiment of the present disclosure transmits an optical pulse to and receives an optical signal from.

FIG. 6 is a flowchart for illustrating a method for quantum cryptographic communication according to an embodiment of the present disclosure.

DETAILED DESCRIPTION

Hereinafter, embodiments of the present disclosure will be described with reference to the accompanying drawings. If like reference symbols are used in several drawings, like reference symbols designate like or identical functions throughout several embodiments.

Figure 1:
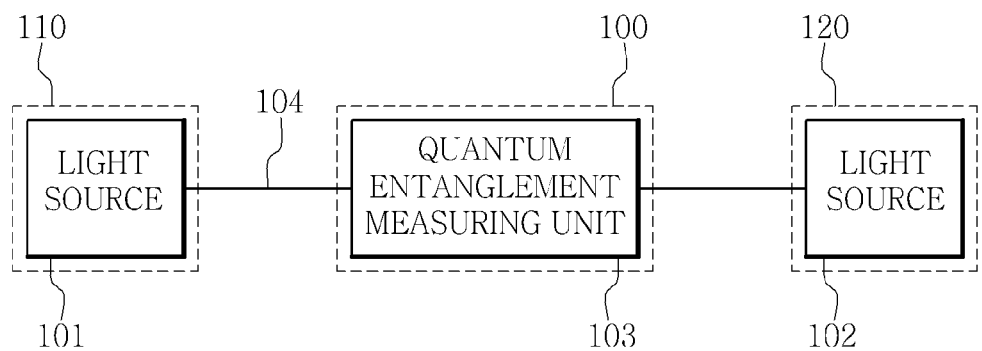
FIG. 1 is a block diagram schematically showing a measurement-device-independent quantum cryptography system.
Figure 2:
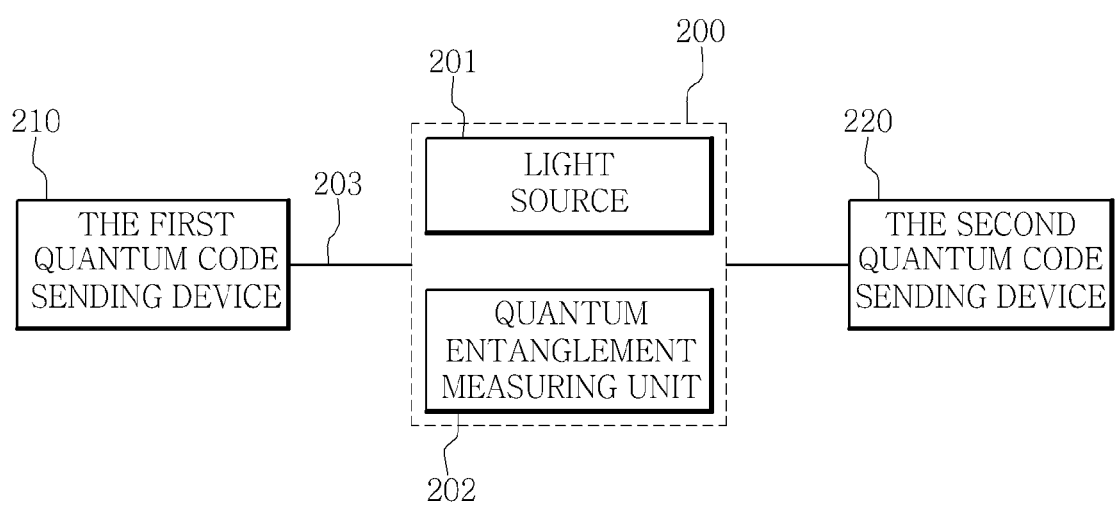
FIG. 2 is a block diagram schematically showing an apparatus for quantum cryptographic communication according to an embodiment of the present disclosure.

FIG. 2 is a block diagram schematically showing an apparatus for quantum cryptographic communication (hereinafter, also referred to as a "quantum cryptographic communication apparatus") according to an embodiment of the present disclosure.

Referring to FIG. 2, a quantum cryptographic communication apparatus (Charlie) 200 may include a light source 201 and a quantum entanglement measuring unit 202. The light source 201 generates an optical pulse which is transmitted to a first quantum code sending device (Alice) 210 and a second quantum code sending device (Bob) 220. In an embodiment, the light source 201 may be a laser light source or a quantum entanglement light source (for example, spontaneous parametric down-conversion photon pair).

The generated optical pulse is transmitted to the first quantum code sending device 210 and the second quantum code sending device 220 through a quantum channel 203, and the quantum channel 203 may be, for example, an optical fiber or an atmosphere (free space). The first quantum code sending device 210 and the second quantum code sending device 220 respectively encodes a key to a quantum state of the optical pulse after receiving the optical pulse to generate an optical signal, and transmits the generated optical signal to the quantum entanglement measuring unit 202. The first quantum code sending device 210 and the second quantum code sending device 220 use different keys for encoding the optical pulse, which may be random numbers.

The quantum entanglement measuring unit 202 measures a relation among quantum states of the plurality of received optical signals after receiving the optical signal from the first quantum code sending device 210 and the second quantum code sending device 220, and transmits the measurement result to the first quantum code sending device 210 and the second quantum code sending device 220 as common information.

The first quantum code sending device 210 and the second quantum code sending device 220 may have the same secure key by restoring a common secure key by using the received information.

The quantum cryptographic communication apparatus according to an embodiment of the present disclosure transmits a photon or an optical pulse having the same characteristics to a plurality of quantum code sending devices from a single light source, and the plurality of quantum code sending devices generates an optical signal by using the photon or the optical pulse generated from the single light source. By doing so, a plurality of optical signals subject to quantum entanglement measurement have the same attribute such as polarization, timing, spectral property or the like. Therefore, an attribute difference measurement device or a feedback device for making the plurality of optical signals have identical attributes not to be distinguished is not required, and thus the quantum cryptographic communication apparatus may be implemented easily with low costs. In addition, since a photon is allowed to reciprocate the same quantum channel 203, it is possible to provide a quantum cryptographic communication apparatus which is robust against environmental changes.

Even though FIG. 2 shows that the light source 201 transmits an optical pulse to two quantum code sending devices 210, 220, the number of quantum code sending devices is not limited thereto but may be over 2. For example, the light source 201 may transmit an optical pulse N×N number (N is a natural number) of quantum code sending devices, and optical signals generated from the N×N number of quantum code sending devices may be transmitted to the quantum entanglement measuring unit 202 to construct N×N network.

Figure 3:
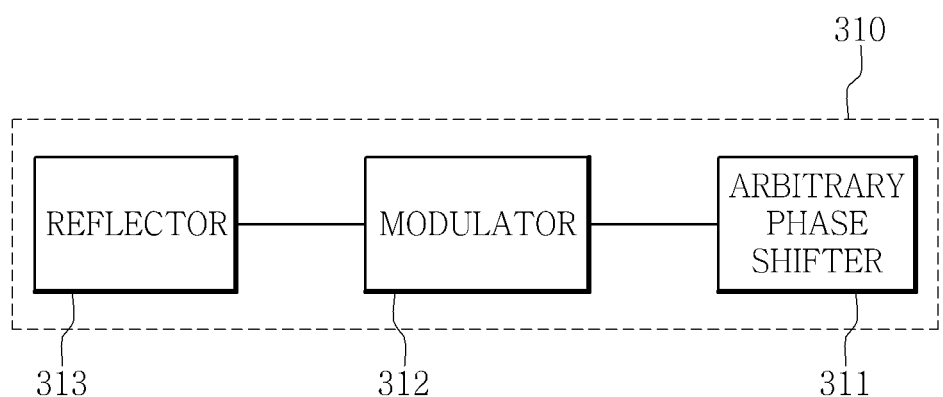

FIG. 3 is a block diagram schematically showing a quantum code sending device which the apparatus for quantum cryptographic communication according to an embodiment of the present disclosure transmits to an optical pulse and receives an optical signal from.

Referring to FIG. 3, the quantum code sending device 310 may include a reflector 313. The reflector 313 changes a heading path of an optical pulse or an optical signal by 180 degrees by reflecting the optical pulse or the optical signal. The optical pulse or the optical signal reflected by the reflector 313 may have modulated or non-modulated quantum state (for example, phase or polarization) when compared with the optical pulse generated by the light source 201 (FIG. 2).

In an embodiment, the reflector 313 may be a Faraday mirror which rotates polarization of an optical pulse or an optical signal and reflects the optical pulse or the optical signal. The Faraday mirror is used for a Faraday rotator to rotate polarization of an incident optical pulse or an incident optical signal by 90 degrees and returns the optical pulse or the optical signal. The polarization of the reflected optical pulse or the reflected optical signal is perpendicular to the polarization of the incident optical pulse or the incident optical signal, and thus the change of polarization or the like caused by environmental factors while the optical signal is being transmitted to the quantum cryptographic communication apparatus 200 (FIG. 2) through the quantum channel 203 (FIG. 2) is automatically corrected. Therefore, it is possible to provide a quantum cryptographic communication apparatus which is robust against environmental changes.

In an embodiment, the quantum code sending device 310 may include an arbitrary phase shifter 311. The arbitrary phase shifter 311 may arbitrarily modulate a quantum state of the optical pulse received from the light source 201 (FIG. 2) or the optical signal received from the optical pulse converting device 312 so that, for example, the phase is modulated.

The quantum entanglement measuring unit included in the quantum cryptographic communication apparatus measures a relation between quantum states of the optical signals by measuring interference among the plurality of optical signals. A first order interference and a second order interference occur between the plurality of optical signals, and the second order interference is measured by the quantum entanglement measuring unit. The first order interference is interference between electromagnetic fields of light and may be measured by using a single detector, but the second order interference is interference among intensities of light and may be measured by using a correlation of two detectors. The quantum cryptographic communication apparatus according to an embodiment of the present disclosure may remove first-order coherence between a plurality of photons by modulating a phase of the optical pulse or the optical signal through an arbitrary phase shifter included in each quantum code sending device, and at this time, arbitrary phase shifters are not synchronized.

In an embodiment, the quantum code sending device 310 may include a modulator 312. The modulator 312 encodes a digital signal corresponding to a key to a quantum state (for example, polarization or phase) of the optical pulse to convert the optical pulse into an optical signal with information. For example, the quantum code sending device 310 modulates polarization of the optical pulse according to a digital signal corresponding to a random number generated by a random number generator to encode the digital signal to the polarization of the optical pulse, thereby generating an optical signal representing the digital signal.

An optical pulse having an attribute modulated by the arbitrary phase shifter 311 may be input to the modulator 312 and converted into an optical signal, or an optical pulse having a non-modulated attribute, received from the light source, may also be input thereto and converted into an optical signal.

Figure 4:
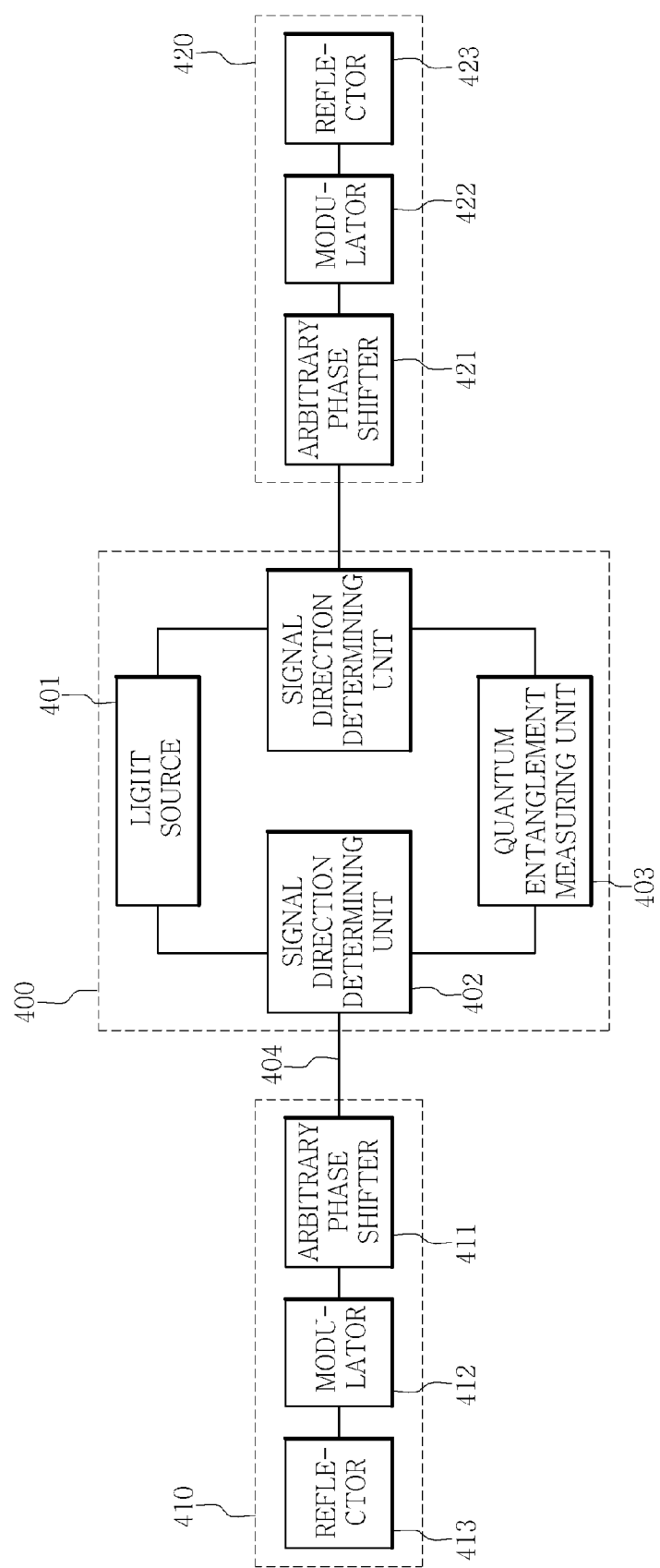
FIG. 4 is a block diagram schematically showing an apparatus for quantum cryptographic communication according to an embodiment of the present disclosure.

FIG. 4 is a block diagram schematically showing an apparatus for quantum cryptographic communication according to an embodiment of the present disclosure.

Referring to FIG. 4, the quantum cryptographic communication apparatus 400 may further include a signal direction determining unit 402. The signal direction determining unit 402 transmits the optical pulse from a light source 401 to a first quantum code sending device 410 or a second quantum code sending device 420, and transmits the optical signal from the first quantum code sending device 410 or the second quantum code sending device 420 to a quantum entanglement measuring unit 403. In other words, signal direction determining unit 402 determines a heading direction of an optical pulse or an optical signal. In an embodiment, the signal direction determining unit 402 may be an optical circulator.

In an embodiment, the quantum cryptographic communication apparatus 400 distributes a secure key as shown in FIG. 4. The optical pulse generated from the light source 401 is input to the signal direction determining unit 402 and transmitted to the first quantum code sending device 410 and the second quantum code sending device 420 through the quantum channel 404 according to a state of the signal direction determining unit 402. The arbitrary phase shifter 411 arbitrarily modulates a phase of the optical pulse received from the quantum cryptographic communication apparatus 400 and transmits the optical pulse to the modulator 412. The modulator 412 encodes a key to a quantum state of the received optical pulse to generate an optical signal, and transmits the generated optical signal toward a reflector 413. The reflector 413 rotates polarization of the incident optical signal, and reflects the optical signal with a rotated polarization to the quantum cryptographic communication apparatus 400. The optical signal is input to the signal direction determining unit 402 through the quantum channel 404, and transmitted to the quantum entanglement measuring unit 403 according to a state of the signal direction determining unit 402. An arbitrary phase shifter 421, a modulator 422 and a reflector 423 of the second quantum code sending device 420 also operate in a similar manner to the arbitrary phase shifter 411, the modulator 412 and the reflector 413 of the first quantum code sending device 410, and as a result, an optical signal is transmitted to the quantum entanglement measuring unit 403. The quantum entanglement measuring unit 403 measures a relation between quantum states of the optical signals received from both quantum code sending devices 410, 420 and transmits the measurement result to both quantum code sending devices 410, 420 so that both quantum code sending devices 410, 420 may restore the secure key and possess a common secure key.

Figure 5:
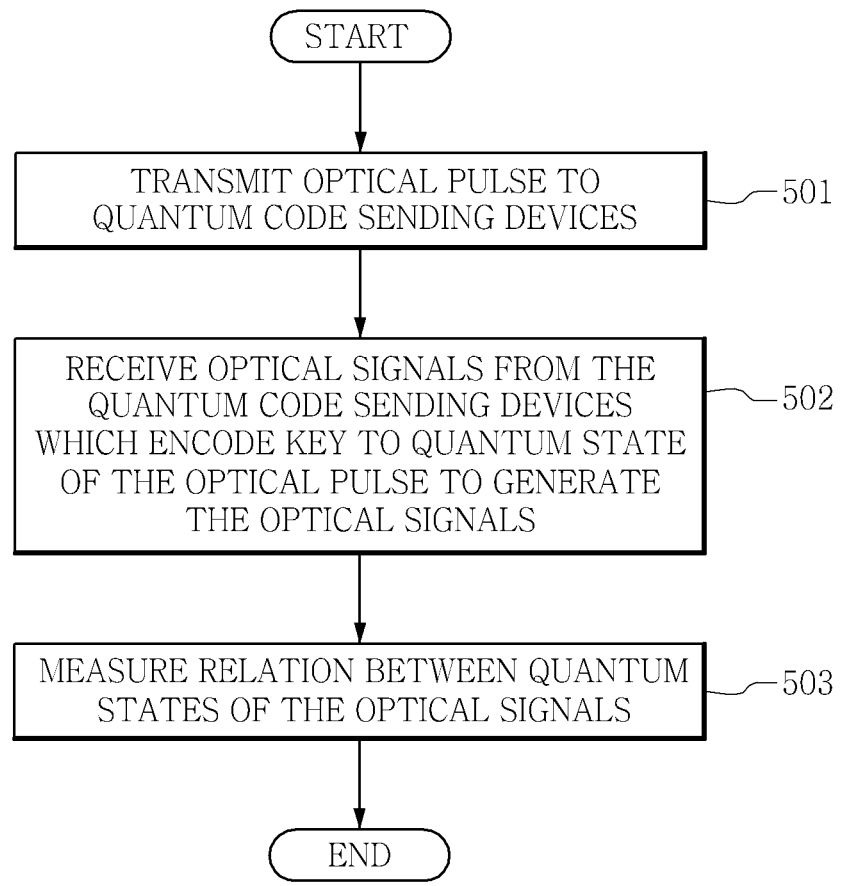
FIG. 5 is a flowchart for illustrating a method for quantum cryptographic communication according to an embodiment of the present disclosure.

FIG. 5 is a flowchart for illustrating a method for quantum cryptographic communication according to an embodiment of the present disclosure.

Referring to FIG. 5, the method for quantum cryptographic communication (hereinafter, also referred to as a "quantum cryptographic communication method") 500 includes transmitting an optical pulse to a plurality of quantum code sending devices (Step 501), receiving a plurality of optical signals from the plurality of quantum code sending devices, wherein the quantum code sending device encodes a key to a quantum state of the optical pulse to generate the plurality of optical signals (Step 502), and measuring a relation between quantum state of the plurality of optical signals (Step 503).

The quantum cryptographic communication method according to an embodiment of the present disclosure transmits a photon or an optical pulse to a plurality of quantum code sending devices from a single light source, and measures a relation among the optical signals generated by using the photon or the optical pulse. By doing so, it is possible to generate and use optical signals having the same attribute without any separate feedback device.

FIG. 6 is a flowchart for illustrating a method for quantum cryptographic communication according to an embodiment of the present disclosure.

Referring to FIG. 6, in an embodiment, a quantum cryptographic communication method 600 may further include arbitrarily modulating a phase of the optical pulse or the optical signal (Step 604) between Step 601 of transmitting an optical pulse to a plurality of quantum code sending devices and Step 602 of receiving a plurality of optical signals from the plurality of quantum code sending devices.

In an embodiment, the quantum cryptographic communication method 600 may further include generating an optical signal by encoding a digital signal corresponding to the key to the optical pulse (Step 605) between Step 601 of transmitting an optical pulse to a plurality of quantum code sending devices and Step 602 of receiving a plurality of optical signals from the plurality of quantum code sending devices.

In an embodiment, the quantum cryptographic communication method 600 may further include reflecting the optical pulse or the optical signal (Step 606) between Step 601 of transmitting an optical pulse to a plurality of quantum code sending devices and Step 602 of receiving a plurality of optical signals from the plurality of quantum code sending devices. In an embodiment, Step 606 of reflecting the optical pulse or the optical signal may include reflecting the optical pulse or the optical signal after rotating a polarization of the optical pulse or the optical signal.

Even though FIG. 6 illustrates the method in the order of Step 604 of arbitrarily modulating a phase of the optical pulse or the optical signal, Step 605 of generating the optical signal by encoding a digital signal corresponding to the key to the optical pulse, and Step 606 of reflecting the optical pulse or the optical signal, the present disclosure is not limited thereto, and these steps (Steps 604, 605, 606) may be executed in a different order.

For example, after Step 601 of transmitting an optical pulse to the plurality of quantum code sending devices, Steps 604 through 606 may be executed in the order of Step 605 of generating the optical signal by encoding a digital signal corresponding to the key to the optical pulse, Step 606 of reflecting the optical pulse or the optical signal, and Step 604 of arbitrarily modulating a phase of the optical pulse or the optical signal. In this case, in Step 606 of reflecting the optical pulse or the optical signal, the optical signal will be reflected. In addition, in Step 604 of arbitrarily modulating a phase of the optical pulse or the optical signal, the optical signal will be modulated.

As another example, Steps 604 through 606 may be executed in the order of Step 606 of reflecting the optical pulse or the optical signal, Step 604 of arbitrarily modulating a phase of the optical pulse or the optical signal, and Step 605 of generating the optical signal by encoding a digital signal corresponding to the key to the optical pulse. In this case, in Step 606 of reflecting the optical pulse or the optical signal, the optical pulse will be reflected. In addition, in Step 604 of arbitrarily modulating a phase of the optical pulse or the optical signal, the optical pulse will be modulated.

In other words, Step 604 of arbitrarily modulating a phase of the optical pulse or the optical signal and Step 605 of generating the optical signal by encoding a digital signal corresponding to the key to the optical pulse may respectively be executed either before or after Step 606 of reflecting the optical pulse or the optical signal.

The present disclosure can be changed or modified by those having ordinary skill in the art without departing from the scope of the present disclosure and thus is not limited to the above embodiments or accompanying drawings.

What is claimed is:

1. An apparatus for quantum cryptographic communication, comprising:
   a light source configured to generate optical pulses that are transmitted to a first optical circulator or a second optical circulator;
   the first optical circulator being configured to transmit a first optical pulse of the light source to a first quantum code sending device and to transmit a first optical signal received from the first quantum code sending device to a quantum entanglement measurer, the first optical signal being generated by encoding a key to a quantum state of the first optical pulse;
   the second optical circulator being configured to transmit a second optical pulse of the light source to a second quantum code sending device and to transmit a second optical signal received from the second quantum code sending device to the quantum entanglement measurer, the second optical signal being generated by encoding a key to a quantum state of the second optical pulse; and
   the quantum entanglement measurer being configured to measure a relationship between quantum states of the first and second optical signals,
   wherein the apparatus is configured to receive optical signals from the first and second quantum code sending devices, each comprising a modulator for encoding a digital signal corresponding to the key to the optical pulse.

2. The apparatus for quantum cryptographic communication according to claim 1, wherein the apparatus is configured to receive optical signals from the first and second quantum code sending devices, each comprising a reflector for reflecting the optical pulse or the optical signal.

3. The apparatus for quantum cryptographic communication according to claim 2, wherein the reflector is a Faraday mirror.

4. The apparatus for quantum cryptographic communication according to claim 1, wherein the apparatus is configured to receive optical signals from the first and second quantum code sending devices, each comprising an arbitrary phase shifter for arbitrarily modulating a phase of the optical pulse or the optical signal.

5. The apparatus for quantum cryptographic communication according to claim 1, wherein the light source is a quantum entanglement light source.

6. The apparatus for quantum cryptographic communication according to claim 1, wherein a number of the plurality of quantum code sending devices is N×N (N is a natural number and x is a mathematical operator representing scalar multiplication).

* * * * *